US012757289B2

(12) United States Patent
Lakshminarayanapuram Krishnakumar et al.

(10) Patent No.: US 12,757,289 B2
(45) Date of Patent: Oct. 6, 2026

(54) DEVICES, METHODS, APPARATUSES, AND COMPUTER READABLE MEDIA FOR ALIGNMENT BETWEEN USER EQUIPMENT AND NETWORK

(71) Applicant: Nokia Technologies Oy, Espoo (FI)

(72) Inventors: Kamakshi Lakshminarayanapuram Krishnakumar, Espoo (FI); Mads Lauridsen, Gistrup (DK); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 243 days.

(21) Appl. No.: 18/794,100

(22) Filed: Aug. 5, 2024

(65) Prior Publication Data

US 2025/0056659 A1 Feb. 13, 2025

Related U.S. Application Data

(63) Continuation of application No. PCT/CN2023/111715, filed on Aug. 8, 2023.

(51) Int. Cl.
*H04W 76/28* (2018.01)
*H04W 72/231* (2023.01)

(52) U.S. Cl.
CPC ......... *H04W 76/28* (2018.02); *H04W 72/231* (2023.01)

(58) Field of Classification Search
CPC ............... H04W 76/28; H04W 72/231; H04W 52/0248; Y02D 30/70
See application file for complete search history.

(56) References Cited

U.S. PATENT DOCUMENTS

2015/0131504 A1* 5/2015 Lin .................. H04W 52/0225 370/311
2020/0205218 A1* 6/2020 Tang .................. H04J 13/0062
(Continued)

FOREIGN PATENT DOCUMENTS

CN 101543120 A 9/2009
CN 112492672 A 3/2021
CN 116367191 A 6/2023

OTHER PUBLICATIONS

"3rd Generation Partnership Project; Technical Specification Group Radio Access Network; Study on network energy savings for NR (Release 18)", 3GPP TR 38.864, V18.1.0, Mar. 2023, pp. 1-72.
(Continued)

*Primary Examiner* — Jael M Ulysse
(74) *Attorney, Agent, or Firm* — Barta Jones, PLLC

(57) ABSTRACT

Various example embodiments relate to devices, methods, apparatuses and computer readable media for alignment between user equipment and network. An example terminal device may be configured to receive, from a network device serving the terminal device, a configuration for discontinuous transmission defining an active period and a non-active period of a cell associated with the network device; receive, from the network device, a first indication indicating that the configuration for the discontinuous transmission is activated; provide a first start offset and a secondary start offset, wherein the first start offset shall be used when the discontinuous transmission is deactivated and the secondary start offset shall be used for the activated configuration for the discontinuous transmission; and select the first start offset or the secondary start offset for connected discontinuous reception of the terminal device during the activated discontinuous transmission of the cell.

20 Claims, 7 Drawing Sheets

(56) References Cited

U.S. PATENT DOCUMENTS

| | | | | |
|---|---|---|---|---|
| 2021/0400580 | A1 | 12/2021 | Maleki et al. | |
| 2022/0303901 | A1* | 9/2022 | Yang | H04W 52/0235 |
| 2024/0237133 | A1* | 7/2024 | Jeon | H04W 52/0206 |
| 2024/0357700 | A1* | 10/2024 | Hu | H04W 52/0206 |
| 2025/0008434 | A1* | 1/2025 | Wang | H04W 52/0235 |
| 2025/0071679 | A1* | 2/2025 | Wang | H04W 52/0216 |
| 2025/0294638 | A1* | 9/2025 | Guo | H04W 52/0216 |
| 2026/0025882 | A1* | 1/2026 | Zhao | H04W 76/28 |
| 2026/0032773 | A1* | 1/2026 | Uemura | H04W 76/28 |

OTHER PUBLICATIONS

"New WID: Network energy savings for NR", 3GPP TSG RAN Meeting #98-e, RP-223540, Agenda: 9.1.1, Huawei, Dec. 12-16, 2022, pp. 1-6.

"3rd Generation Partnership Project; Technical Specification Group Radio Access Network; NR; Medium Access Control (MAC) protocol specification (Release 17)", 3GPP TS 38.321 V17.5.0, Jun. 2023, pp. 1-253.

"Discussion on cell DTX and DRX", 3GPP TSG-RAN WG2 Meeting #121bis-e, R2-2302797, Huawei, Agenda item: 7.3.2, Apr. 17-26, 6 pages.

International Search Report and Written Opinion received for corresponding Patent Cooperation Treaty Application No. PCT/CN2023/111715, dated Apr. 11, 2024, 7 pages.

"Discontinuous reception and transmission in SL", 3GPP TSG-RAN WG2 Meeting #112 electronic, R2-2009696, Lenovo, Agenda item: 8.15.2, Nov. 2-13, 2020, pp. 1-7.

* cited by examiner

DEVICES, METHODS, APPARATUSES, AND COMPUTER READABLE MEDIA FOR ALIGNMENT BETWEEN USER EQUIPMENT AND NETWORK

TECHNICAL FIELD

Various exemplary embodiments generally relate to communication technologies, and more particularly, to devices, methods, apparatuses, and computer readable media for start offset alignment between cell discontinuous transmission (cell DTX) and connected discontinuous reception (c-DRX) of a user equipment (UE).

BACKGROUND

Reducing the power consumption is important for a wireless communication system. On the UE side, c-DRX may be configured for a UE, and the UE may use the c-DRX to reduce the UE power consumption. On the network side, cell discontinuous reception (cell DRX), cell DTX, etc. have been introduced for network energy saving (NES).

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for more detailed description provided below.

In a first aspect, an example embodiment of an apparatus for a terminal device is provided. The apparatus may comprise at least one processor and at least one memory storing instructions. The instructions may, when executed by the at least one processor, cause the terminal device at least to: receive, from a network device serving the terminal device, a configuration for discontinuous transmission defining an active period and a non-active period of a cell associated with the network device; receive, from the network device, a first indication indicating that the configuration for the discontinuous transmission is activated; provide a first start offset and a secondary start offset, wherein the first start offset shall be used when the discontinuous transmission is deactivated and the secondary start offset shall be used for the activated configuration for the discontinuous transmission; and select the first start offset or the secondary start offset for connected discontinuous reception of the terminal device during the activated discontinuous transmission of the cell.

In a second aspect, an example embodiment of an apparatus for a network device is provided. The apparatus may comprise at least one processor and at least one memory storing instructions. The instructions may, when executed by the at least one processor, cause the network device at least to: transmit, to a terminal device being served by the network device, a configuration for discontinuous transmission defining an active period and a non-active period of a cell associated with the network device; transmit, to the network device, a first indication indicating that the configuration for the discontinuous transmission is activated; and provide the terminal device with information on a first start offset and a secondary start offset, wherein the first start offset shall be used by the terminal device when the discontinuous transmission is deactivated and the secondary start offset shall be used by the terminal device for the activated configuration for the discontinuous transmission.

In a third aspect, an example embodiment of a method implemented at a terminal device is provided. The method may comprise: receiving, from a network device serving the terminal device, a configuration for discontinuous transmission defining an active period and a non-active period of a cell associated with the network device; receiving, from the network device, a first indication indicating that the configuration for the discontinuous transmission is activated; providing a first start offset and a secondary start offset, wherein the first start offset shall be used when the discontinuous transmission is deactivated and the secondary start offset shall be used for the activated configuration for the discontinuous transmission; and selecting the first start offset or the secondary start offset for connected discontinuous reception of the terminal device during the activated discontinuous transmission of the cell.

In a fourth aspect, an example embodiment of a method implemented at a network device is provided. The method may comprise: transmitting, to a terminal device being served by the network device, a configuration for discontinuous transmission defining an active period and a non-active period of a cell associated with the network device; transmitting, to the network device, a first indication indicating that the configuration for the discontinuous transmission is activated; and providing the terminal device with information on a first start offset and a secondary start offset, wherein the first start offset shall be used by the terminal device when the discontinuous transmission is deactivated and the secondary start offset shall be used by the terminal device for the activated configuration for the discontinuous In a fifth aspect, an example embodiment of an apparatus is provided. The apparatus as a terminal device may comprise: means for receiving, from a network device serving the terminal device, a configuration for discontinuous transmission defining an active period and a non-active period of a cell associated with the network device; means for receiving, from the network device, a first indication indicating that the configuration for the discontinuous transmission is activated; means for providing a first start offset and a secondary start offset, wherein the first start offset shall be used when the discontinuous transmission is deactivated and the secondary start offset shall be used for the activated configuration for the discontinuous transmission; and means for selecting the first start offset or the secondary start offset for connected discontinuous reception of the terminal device during the activated discontinuous transmission of the cell.

In a sixth aspect, an example embodiment of an apparatus is provided. The apparatus as a network device may comprise: means for transmitting, to a terminal device being served by the network device, a configuration for discontinuous transmission defining an active period and a non-active period of a cell associated with the network device; means for transmitting, to the network device, a first indication indicating that the configuration for the discontinuous transmission is activated; and means for providing the terminal device with information on a first start offset and a secondary start offset, wherein the first start offset shall be used by the terminal device when the discontinuous transmission is deactivated and the secondary start offset shall be used by the terminal device for the activated configuration for the discontinuous transmission.

In a seventh aspect, an example embodiment of a computer readable medium is provided. The computer readable medium may comprise instructions stored thereon, and the instructions may, when executed by a terminal device, cause the terminal device to perform at least the following: receiving, from a network device serving the terminal device, a configuration for discontinuous transmission defining an active period and a non-active period of a cell associated with the network device; receiving, from the network device, a first indication indicating that the configuration for the discontinuous transmission is activated; providing a first start offset and a secondary start offset, wherein the first start offset shall be used when the discontinuous transmission is deactivated and the secondary start offset shall be used for the activated configuration for the discontinuous transmission; and selecting the first start offset or the secondary start offset for connected discontinuous reception of the terminal device during the activated discontinuous transmission of the cell.

In an eighth aspect, an example embodiment of a computer readable medium is provided. The computer readable medium may comprise instructions stored thereon, and the instructions may, when executed by a network device, cause the network device to perform at least the following: transmitting, to a terminal device being served by the network device, a configuration for discontinuous transmission defining an active period and a non-active period of a cell associated with the network device; transmitting, to the network device, a first indication indicating that the configuration for the discontinuous transmission is activated; and providing the terminal device with information on a first start offset and a secondary start offset, wherein the first start offset shall be used by the terminal device when the discontinuous transmission is deactivated and the secondary start offset shall be used by the terminal device for the activated configuration for the discontinuous transmission.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

As described above, in the wireless communication system, the network device (e.g., a base station) may enter a cell DTX mode to save energy. In the cell DTX mode, the base station may periodically switch between an active transmission mode and a non-active transmission mode (e.g., a sleep mode), and thus have no transmission or only keep limited transmission. The base station may switch between the active mode and the non-active mode based on a DTX pattern of the base station. The cell DTX pattern may also be referred to as cell DTX configuration.

Figure 1A:
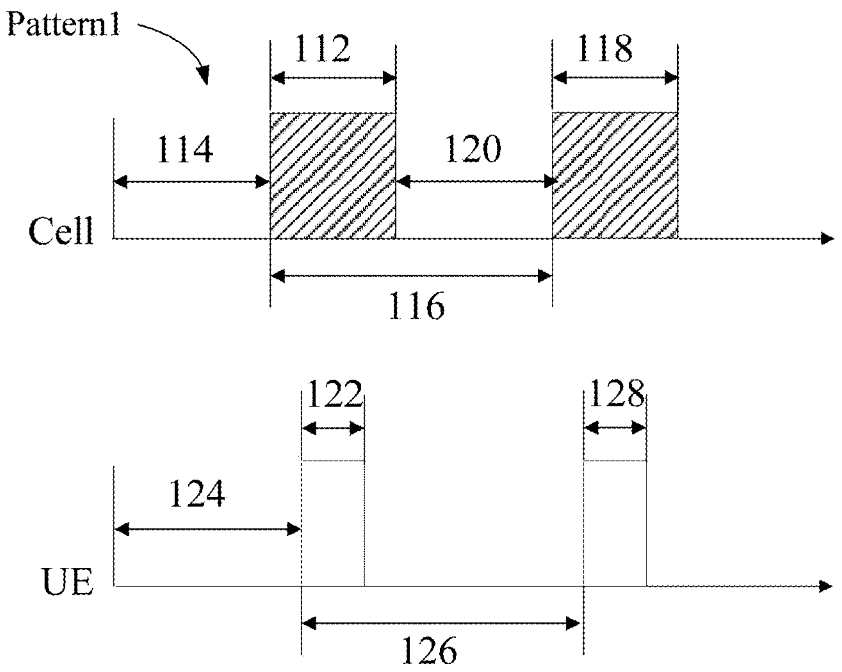
FIGS. 1A-1B illustrate communication schemes employing cell DTX and UE c-DRX.

FIG. 1A illustrates a communication scheme employing cell DTX. Referring to the FIG. 1A, a cell of the base station is configured with a DTX pattern, shown as pattern 1. The DTX pattern 1 may be defined by a set of DTX parameters, which may comprise an active period 112, a start offset 114, and a periodicity 116. The active period 112 may refer to a time duration in which the base station may transmit messages to the UEs served by the cell. The start offset 114 (e.g., cell DTX start offset) may refer to a time interval between the beginning of a scheduling timing and the start of the active period 112. In other words, the start offset 114 may define where the cell DTX active period would start. The periodicity 116 (e.g., cell DTX periodicity) may refer to a time interval between the start of the active period 112 and the start of the next active period 118. Based on these parameters, a non-active period 120 may be derived, e.g., by a difference value between the periodicity 116 and the active period 112. During the non-active period 120, the base station generally does not transmit downlink traffic to the UEs. In some examples, the base station does not need to transmit some periodic signals, e.g., a synchronization signal block (SSB), a channel state information reference signal (CSI-RS) or other common channels or signals. Thus, the network energy is conserved.

Additionally, one or more UEs served in the cell of the base station may be configured to enter the c-DRX mode to reduce power consumption, for example, during low load scenarios. In a c-DRX mode, the UE may be in a connected state (an RRC_CONNECTED) with respect to the cell of the base station, and may switch between an active mode and a non-active mode based on c-DRX configuration.

Still referring to FIG. 1A, which also illustrates a communication scheme employing c-DRX by the UE, the c-DRX configuration may comprise an on-duration period 122, a start offset 124, and a periodicity 126. The on-duration period 122 may refer to a time duration in which the UE is configured to be in an active mode. During the on-duration period 122, the UE may monitor a physical downlink control channel (PDCCH). The start offset 124 (e.g., UE c-DRX start offset) may refer to a time interval between the beginning of a scheduling timing and the start of the on-duration period 122. In other words, the start offset 124 may define the start of the c-DRX on-duration 122. The periodicity 126 (e.g., UE c-DRX periodicity) may refer to a time interval between the start of the on-duration period 122 and the start of the next on-duration period 128.

When the cell DTX mode is configured and activated, it is beneficial for the UE to adopt a UE c-DRX that aligns with the cell DTX. The base station and one or more UEs may experience energy savings when the active period of cell DTX overlaps with the on-duration period of UE c-DRX in the time domain. For example, as illustrated in FIG. 1A, the on-duration periods 122, 128 of the UE c-DRX fall within the active periods 112, 118 of the cell DTX, respectively. Thus, the UE may monitor PDCCH during the c-DRX on-duration period, while entering a low-power mode during other time periods.

Generally, the UE c-DRX is configured via a radio resource configuration (RRC) signaling, and different UEs can be individually configured via the RRC signaling, with a different c-DRX to align with a specific cell DTX pattern. This poses a challenge when a cell is configured with multiple cell DTX patterns or the cell is reconfigured with a new cell DTX pattern, and a group-common signaling, e.g., downlink control information (DCI) may be used to trigger activation of a cell DTX pattern. Under such dynamic mechanism, there is a need to quickly and dynamically align the UE c-DRX with the currently activated cell DTX pattern. Otherwise, there is a risk that a UE has c-DRX on-duration period aligned with a previous cell DTX pattern, but not with the currently activated cell DTX pattern.

Figure 1B:
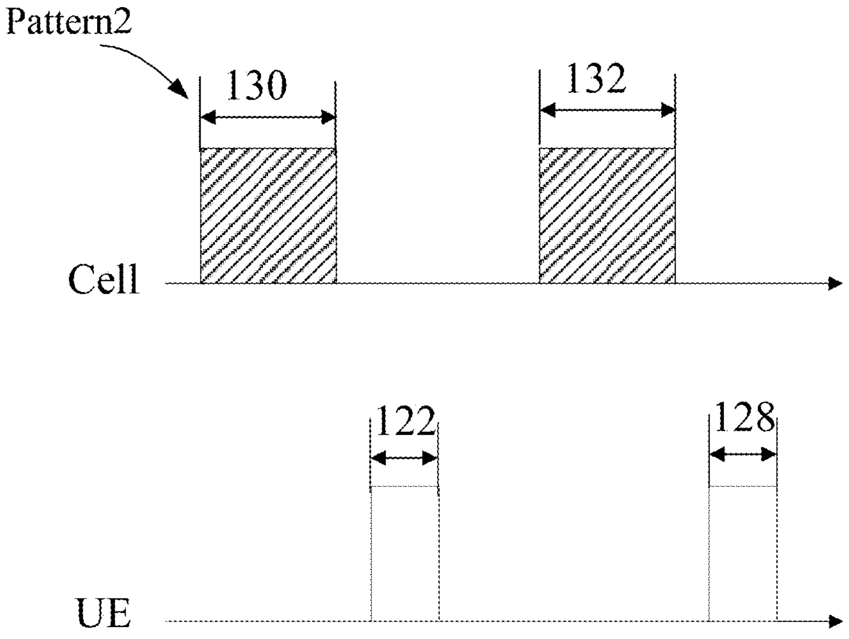

For example, referring to FIG. 1B, a scenario is illustrated that the cell is dynamically triggered with a new cell DTX pattern, shown as pattern 2 in the FIG. 1B. The pattern 2 may comprise a different set of parameters (e.g., active period, start offset, periodicity) than those of the pattern 1 shown in FIG. 1A. For example, the pattern 2 may comprise active periods 130, 132 that are misaligned with the UE c-DRX on-duration periods 122, 128. In other words, if the cell DTX pattern 2 is dynamically activated, it could result in the UE not having c-DRX on-duration period during the cell DTX active period. In this case, the network may reconfigure the UE via a dedicated RRC signaling to align the UE c-DRX on-duration period with the active period of the currently activated cell DTX pattern, for example, to ensure the c-DRX on-duration at least partly falls within the cell DTX active period, so that the UE can monitor PDCCH during the cell DTX active period. However, to reconfigure the individual UE via dedicated RRC signaling may result in an increase of signaling overhead. To minimize the signaling overhead, it is important to avoid that the network (e.g., base station) reconfigures the c-DRX parameters for every UE by use of the RRC reconfiguration procedure.

Hereinafter, example embodiments of methods and apparatuses supporting dynamic alignment of the UE c-DRX and cell DTX would be described in detail with reference to the drawings. According to the example embodiments of the present disclosure, the UE can provide a start offset for the c-DRX on duration, to ensure that the c-DRX on duration at least partly overlaps with the active period of the activated cell DTX pattern. The example embodiments avoids the time and energy costly RRC reconfiguration of the UE c-DRX. Thus, signaling overhead can be reduced, and energy savings can be achieved at the UE side and the network side.

Figure 2A:
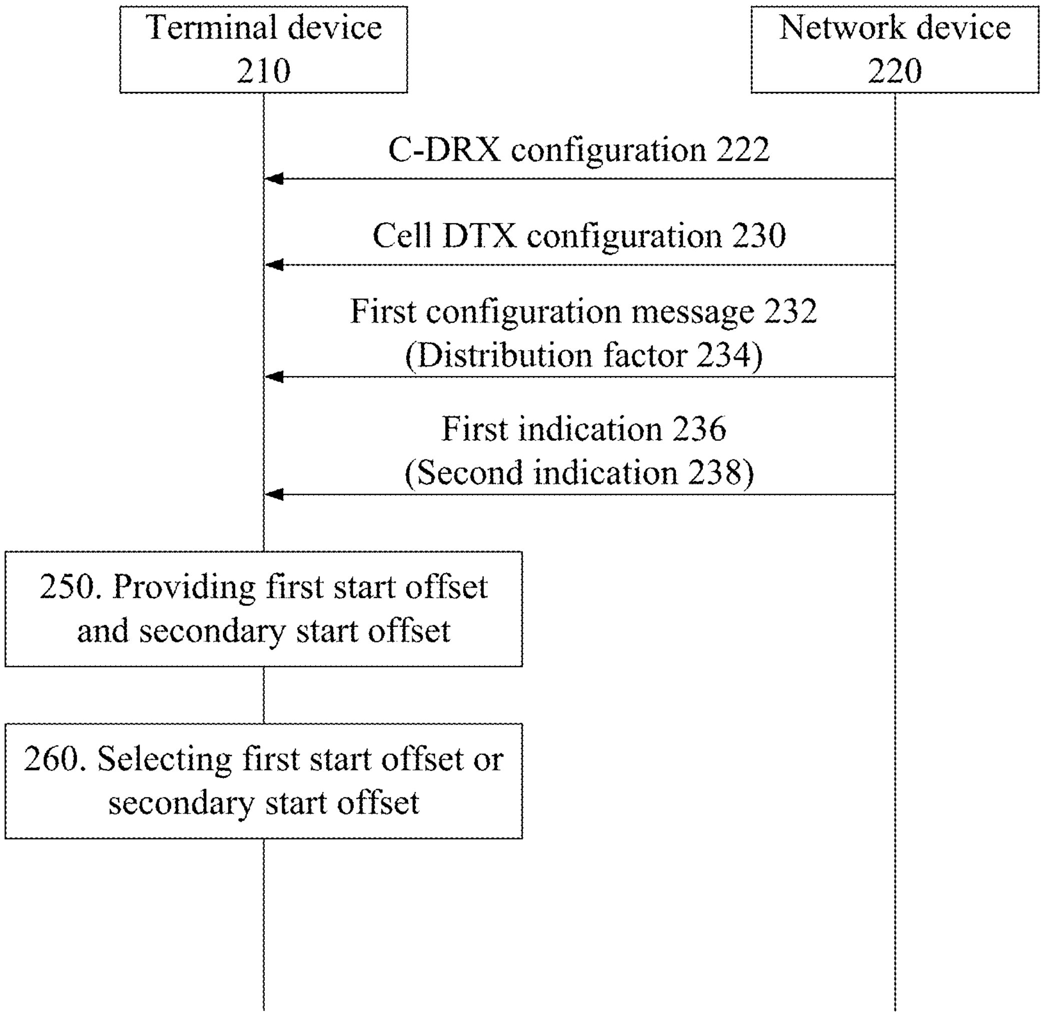
FIG. 2A is an exemplary sequence diagram illustrating example operations for performing alignment of the cell DTX and UE c-DRX according to example embodiments of the present disclosure.

FIG. 2A is an exemplary sequence diagram illustrating example operations for performing alignment of the cell DTX and UE c-DRX according to example embodiments of the present disclosure. In some implementations, the operations shown in the FIG. 2A may be performed by a terminal device 210 and a network device 220. The terminal device 210 may represent any terminal device in a wireless communication system, and the network device 220 may function as the network side serving the terminal device 210.

In a default state, the network device 220 has provided the terminal device 210 with information on a first start offset. For example, the network device 220 may transmit a c-DRX configuration 222 to the terminal device 210. The c-DRX configuration 222 may comprise an on-duration period, a periodicity, and the first start offset. The first start offset defines the start of the on-duration of the c-DRX of the terminal device 210 and shall be used at least when the cell DTX is deactivated. Alternatively or additionally, as discussed with reference to the FIG. 1A, the first start offset is used when an original cell DTX (pattern1) is in use but the cell DTX to be used (pattern2 in the FIG. 1B) is not activated.

Referring to the FIG. 2A, the network device 220 may transmit a cell DTX configuration 230 to the terminal device 210. The cell DTX configuration 230 defines an active period (i.e., cell DTX on-duration) and a non-active period of the cell associated with the network device 220. In some embodiments, the cell DTX configuration 230 may be transmitted via an RRC signaling, e.g., an RRC reconfiguration message. In another embodiment, the network device(s) 220 may transmit the cell DTX configuration in system information, e.g. system information block (SIB).

The network device 220 may also provide the terminal device 210 with information on a secondary start offset, which defines the start of the on-duration of the c-DRX of the terminal device 210 and shall be used when the cell DTX configuration 230 is activated. In some embodiments, the information on the secondary start offset may be e.g. a first configuration message 232. The first configuration message 232 may include a distribution factor 234 corresponding to the cell DTX configuration 230, and the distribution factor 234 may be used for the terminal device 210 to determine the secondary start offset. In a case where the cell DTX configuration 230 includes one or more cell DTX configurations, the distribution factor 234 may include one or more distribution factors corresponding to the one or more cell DTX configurations. Alternatively or additionally, the first configuration message 232 may include a flag or bit to indicate that the terminal device 210 shall re-compute the secondary start offset if the cell DTX configuration 230 is activated.

In some embodiments, the first configuration message 232 may be transmitted via an RRC signaling, e.g., an RRC reconfiguration message. The first configuration message 232 and the cell DTX configuration 230 may be transmitted via the same RRC signaling (as different information elements of the same message) or different RRC signalings (in different messages).

For example, the RRC signaling carrying the cell DTX configuration 230 and the distribution factor 234 may include the following form:

```
CellDTX-Pattern :: SEQUENCE {
    dtx-StartOffset
    dtx-OnDurationTimer
ue-StartOffsetDistributionFactor ENUMERATED
{dot1, dot2, dot5 .., one} OPTIONAL
}
```

The network device 220 may activate the DTX configuration 230 on the cell and may additionally transmit to the terminal device 210 a first indication 236 indicating that the cell DTX 230 is activated. In a case where the cell DTX configuration 230 includes one or more cell DTX configurations, the first indication 236 may indicate which of the one or more cell DTX configurations included in the cell DTX configuration 230 is activated. The first indication 236 may be transmitted later than the cell DTX configuration 230. For example, the first indication 236 may be transmitted via downlink control information (DCI).

In an operation 250, the terminal device 210 may provide the first start offset and the secondary start offset, for example, in order to determine the start of the on-duration period according to the c-DRX configuration 222. In some embodiments, upon receiving the c-DRX configuration 222 from the network device 220, the terminal device 210 may be provided with the first start offset which has been included in the c-DRX configuration 222. Then, the terminal device 210 may provide itself with the first start offset for the determination of the start of the on-duration period according to the c-DRX configuration 222, which may be regarded as the default state of the terminal device 210. For the secondary start offset, in some embodiments, the terminal device 210 may compute the secondary start offset based on the distribution factor 234.

In some embodiments, the first indication 236 may include a second indication 238 to indicate the terminal device 210 whether to compute the secondary start offset (herein also referred to as a c-DRX start offset), in order to align the UE c-DRX with the activated cell DTX. The second indication 238 may be a flag or bit in the first indication 236. Alternatively, the network device 220 may transmit the second indication 238 in DCI separated from the first indication 236.

If the second indication 238 indicates the terminal device 210 to compute the secondary start offset, in the operation 250, the network device does not signal the secondary start offset explicitly to the terminal device, and the terminal device 210 may compute the secondary start offset based on at least one of the start offset of the activated cell DTX configuration 230, the first start offset, the cell DTX active period, or the distribution factor 234 corresponding to the activated cell DTX configuration 230. For example, the terminal device 210 may compute the secondary start offset in the following formula (1).

$$\text{Secondary start offset} = \text{cell}\,DTX\text{ start offset} + (RRC\text{ configured }UE\ c\text{-}DRX\text{ startOffset})\ \%\ (\text{cell}DTX\text{OnDuration} * ue\text{-StartOffsetDistributionFactor}) \quad (1)$$

where % stands for the modulo operation, the RRC configured UE c-DRX StartOffset is the first start offset, the cellDTXOnDuration represents the cell DTX active period, and the ue-StartOffsetDistributionFactor represents the distribution factor 234.

In an example, the value of the distribution factor 234 may be configured by the network device 220 depending on the UE c-DRX on-duration and the cell DTX active period to make the on-duration period of the c-DRX at least partly overlap with the active period of the activated cell DTX. For example, the factor may be in a range of 0.1 to 1, and a default value may be e.g. 0.5.

The cell DTX start offset is used as a start point for the computation, so it ensures that the computed secondary start offset results in a system frame number (SFN) within the cell DTX active period. In other words, the corresponding c-DRX on-duration would at least overlap with the cell DTX active period. In addition, the modulo operation would distribute the c-DRX on-duration of multiple UEs served in the cell inside the cell DTX active period, which is advantageous from the perspective of improving the reliability of message transmission/reception.

It is to be appreciated that the above computation formula (1) is only exemplary, and not limiting. For example, the terminal device 210 may compute the secondary start offset based on only one or more parameters of the cell DTX start offset, the UE c-DRX StartOffset, or the cellDTXOnDuration, i.e., without the distribution factor.

In some embodiments, the first indication 236 may be without such second indication 238. In other words, there is no such second indication 238 included in the first indication 236. In this case, the first indication 236 itself may be the indication indicating the computation of the secondary start offset, and the terminal device 210 may compute the secondary start offset, for example, according to the formula (1) in the operation 250 when receiving the first indication 236.

In some embodiments, in the operation 250, the terminal device 210 may compute the secondary start offset based on the activated cell DTX configuration 230 and the identifier (ID) of the terminal device 210. For example, the terminal device 210 may compute the secondary start offset based on at least one of the start offset of the activated cell DTX configuration 230, the ID of the terminal device 210 or the active period of the activated cell DTX configuration 230. For example, the terminal device 210 may compute the secondary start offset in the following formula (2).

$$\text{Secondary start offset} = \text{cell}\,DTX\ \text{start offset} + (UE\ ID)\,\%\ \text{cell}DTX\text{OnDuration} \quad (2)$$

where % stands for the modulo operation, and the cellDTX-OnDuration represents the cell DTX active period, the UE ID may be cell radio network temporary identifier (C-RNTI) or the fifth generation system architecture evolution (SAE) temporary mobile station identifier (5G-S-TMSI) of the terminal device 210.

With the first start offset and/or the secondary start offset, in an operation 260, the terminal device 210 may select the first start offset or the secondary start offset for c-DRX of the terminal device 210 during the activated cell DTX.

For example, if the terminal device 210 has computed the secondary start offset in the operation 250, in the operation 260, the terminal device 210 may select the second start offset. If the second indication 238 indicates the terminal device 210 not to compute the new c-DRX start offset, in the operation 260, the terminal device 210 may still select the first start offset.

In some embodiments, the first start offset may be selected in the operation 260 if the on-duration period of the c-DRX according to the first start offset at least partly overlaps with the active period of the activated cell DTX configuration 230. In this case, the first start offset is reused. As an option, the network may configure whether or not the first start offset is allowed to be selected and reused in this case.

Figure 2B:
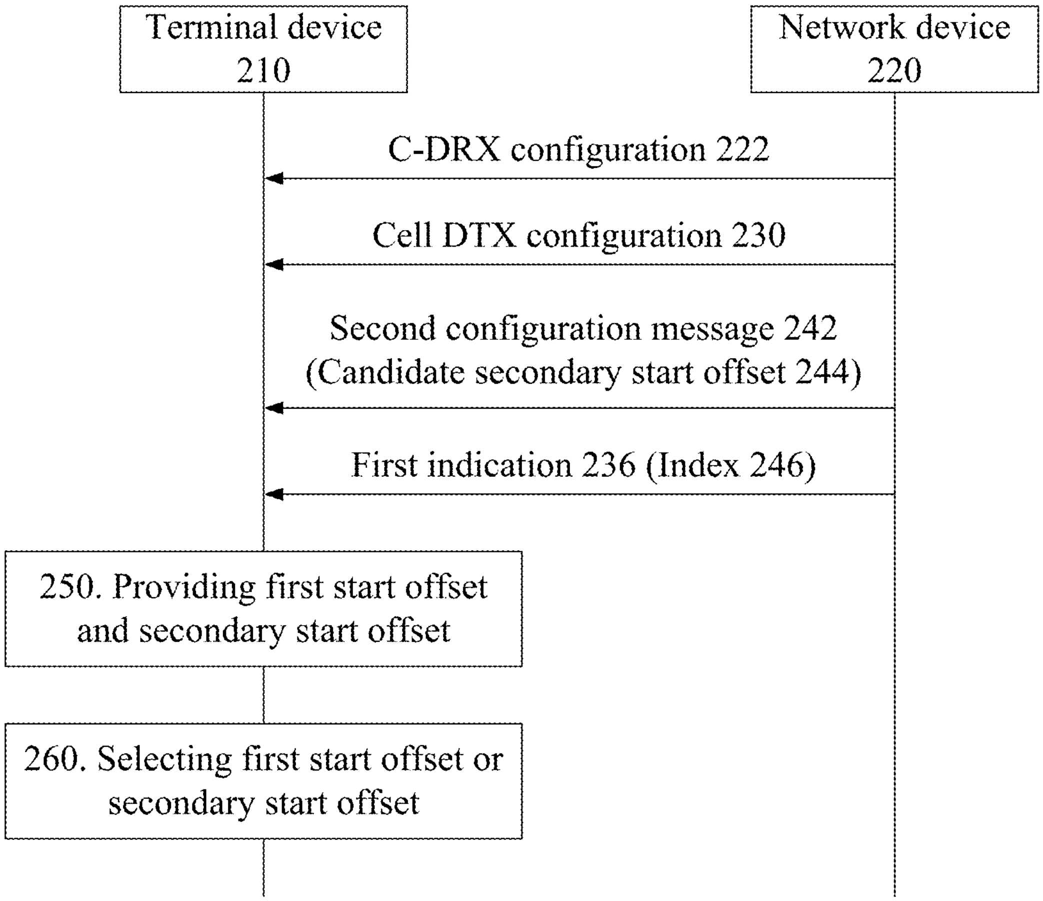
FIG. 2B is another exemplary sequence diagram illustrating example operations for performing alignment of the cell DTX and UE c-DRX according to example embodiments of the present disclosure.

FIG. 2B is another exemplary sequence diagram illustrating example operations for performing alignment of the cell DTX and UE c-DRX according to example embodiments of the present disclosure. The exemplary sequence in the FIG. 2B may be performed by the terminal device 210 and the network device 220. And in the default state, the terminal device 210 has been provided by the network device 220 with the information on the first start offset, for example, the terminal device 210 may have been configured with the c-DRX configuration 222 including the first start offset.

Referring to the FIG. 2B, the network device 220 may transmit to the terminal device 210 the cell DTX configuration 230. The network device 220 may also provide the terminal device 210 with information on the secondary start offset. In some embodiments, the information on the secondary start offset may be e.g. a second configuration message 242. In some embodiments, the second configuration message 242 may include at least one secondary start offset, and the at least one secondary start offset in the second configuration message 242 may have an index corresponding to the cell DTX configuration, respectively, and may be regarded as at least one candidate secondary start offset 244.

In some embodiments, the second configuration message 242 may be transmitted via an RRC signaling, e.g., an RRC reconfiguration message. The second configuration message 242 and the cell DTX configuration 230 may be transmitted via the same RRC signaling or different RRC signalings.

For example, the RRC signaling carrying the second configuration message 242 may include the following form:

```
DRX-ConfigExt-v18 :: SEQUENCE {
  secondStartOffsetList SEQUENCE
  ( SIZE(1..maxDTXPattern)) OF drx-LongCycleStartOffset
OPTIONAL
}
```

The network device 220 may activate the DTX configuration 230 on the cell and may additionally transmit to the terminal device 210 the first indication 236 indicating that the cell DTX 230 is activated.

In some embodiments, the first indication 236 may include an index 246 corresponding to one of the at least one candidate secondary start offset 244. In this case, the first indication 236 indicates one of the at least one secondary start offset, and in the operation 250, the terminal device 210 may determine the secondary start offset based on the first indication 236. The secondary start offset corresponding to the index 246 is determined to apply for the activated cell DTX configuration 230. And in the operation 260, the secondary start offset is selected.

In some embodiments, the first indication 236 may be without such index 246. In other words, there is no such index 246 included in the first indication 236. In a case where the cell DTX configuration 230 includes at least one cell DTX configuration, the at least one candidate secondary start offset 244 may correspond to the at least one cell DTX configuration. The first indication 236 may indicate which of the at least one cell DTX configuration included in the cell DTX configuration 230 is activated. Thus, when receiving the first indication 236, in the operation 250, the terminal device 210 may determine the secondary start offset corresponding to the activated cell DTX configuration 230.

For example, the cell DTX configuration 230 includes three cell DTX configurations numbered #2, #3, #4, and the at least one candidate secondary start offset 244 is shown in a sequence [a, b, c] and correspond to the cell DTX configurations #2, #3, #4, respectively. When receiving the first indication 236 indicating the cell DTX configuration #3 is activated, the secondary start offset b is determined to apply for the activated cell DTX configuration 230. Then in the operation 260, the secondary start offset is selected.

In some embodiments, the secondary start offset may be made with reference to the cell DTX active period start. Such the secondary start offset may indicate where within the cell DTX active period would the terminal device 210 start monitoring for data and enables to distribute the c-DRX on-duration starts within the cell DTX active period. The cell DTX configuration itself would employ terminal device 210 with the information on where the cell DTX would start. The terminal device 210 identifies where the first cell DTX active period, occurring after the current c-DRX on-duration, is applied.

In some embodiments, if the secondary start offset is selected, when the cell DTX configuration 230 is deactivated at a later time, for example, if the network load is high, the terminal device 210 may resume to apply the first start offset, so as to allow wider distribution of UE c-DRX on-duration for the high network load.

Figure 3:
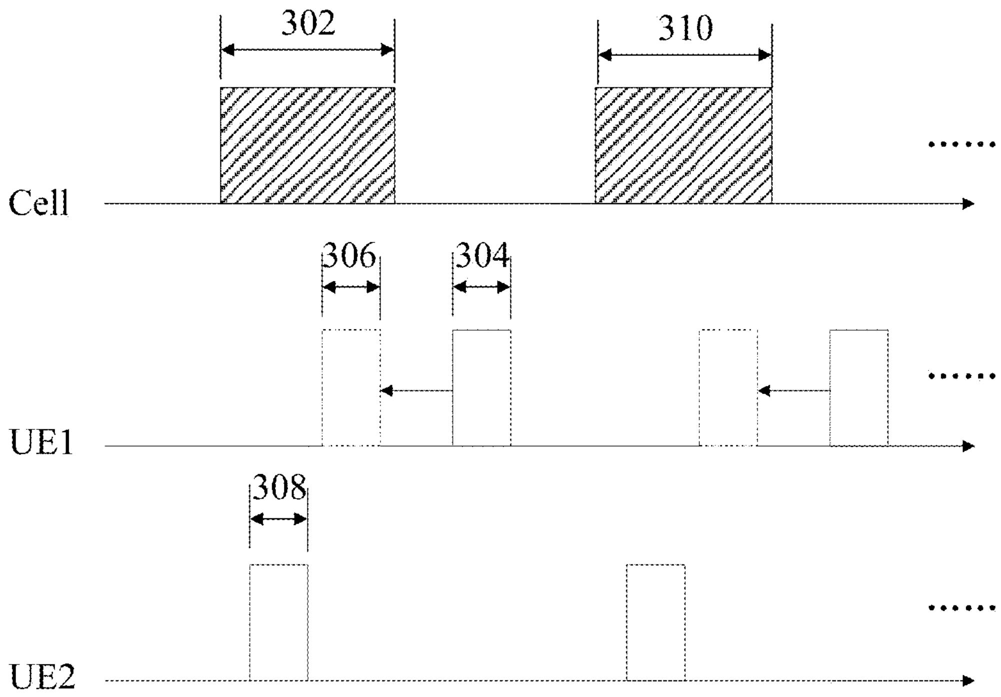
FIG. 3 illustrates communication schemes employing alignment of the UE c-DRX on-duration period to the cell DTX active period according to example embodiments of the present disclosure.

By way of example, FIG. 3 illustrates communication schemes employing alignment of the UE c-DRX on-duration to the cell DTX active period according to example embodiments of the present disclosure.

Referring to the FIG. 3, assuming the cell DTX configuration is activated, or the cell is dynamically triggered with a new cell DTX configuration, the (new) cell DTX configuration comprises an active period 302 and an active period 310. The terminal device UE1 is configured with the c-DRX first start offset that results in the on-duration period 304 not overlapping with the active period 302. Then, the UE1 may compute or determine the c-DRX secondary start offset such that the corresponding on-duration period 306 falls within the active period 302. In some embodiments, when the cell DTX configuration is deactivated, the UE1 may apply the first start offset.

On the other hand, for terminal device UE2, it is configured with the c-DRX first start offset that already results in the on-duration period 308 falling within the active period 302. In this case, the UE2 may reuse the first start offset and need not to compute the c-DRX secondary start offset. Thus, the illustrated example allows network energy savings in a low load case when cell DTX is activated without RRC reconfiguration, while allowing wider distribution of UE c-DRX on-duration in high load case when the cell DTX is not activated or the cell DTX configuration is released.

In a case where the on-duration period of the c-DRX according to the secondary start offset falls outside the active period of the activated cell DTX, for example, referring to the FIG. 3, if the on-duration period of the c-DRX of the UE according to the computed or determined secondary start offset is still not overlapping with the active period of the activated cell DTX, the UE1 may monitor the PDCCH at a start of the first active period of the activated cell DTX after the UE's c-DRX on-duration period 304, e.g., at the start of the upcoming active period 310.

Although the above example embodiments are implemented to align the UE c-DRX with the cell DTX, those skilled in the art may understand that the above disclosure can also be implemented to align the UE c-DRX with cell DRX in a similar way.

Figure 4:
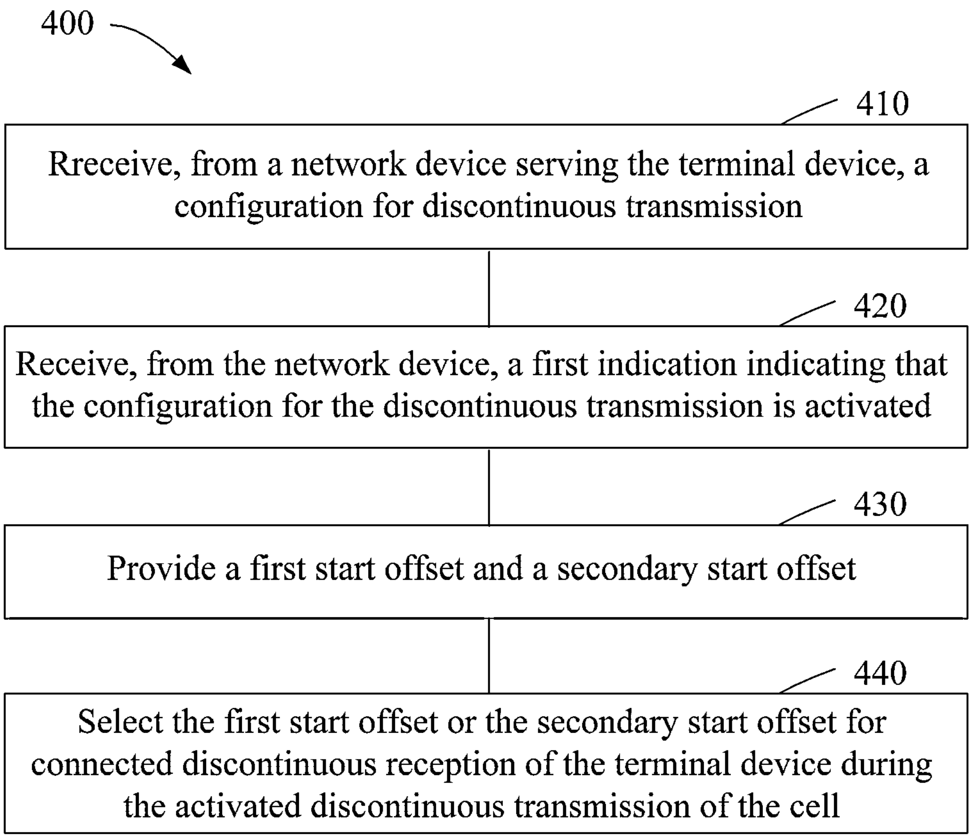
FIG. 4 shows a flow chart illustrating an example method implemented at a terminal device according to example embodiments of the present disclosure.

FIG. 4 shows a flowchart of an example method 400 for performing alignment of the cell DTX and UE C-DRX according to an example embodiment of the present disclosure. The method 400 can be implemented at a terminal device e.g. the terminal device 210 discussed above. In some example embodiments, the method 400 may further include one or more steps that are performed at the terminal device 210 as described above with respect to FIGS. 2-3. It would also be understood that details of some steps in the procedure 400 have been discussed above with respect to FIGS. 2-3 and the procedure 400 will be described here in a simple manner.

At block 410, the terminal device may receive, from a network device serving the terminal device, a configuration for discontinuous transmission defining an active period and a non-active period of a cell associated with the network device.

At block 420, the terminal device may receive, from the network device, a first indication indicating that the configuration for the discontinuous transmission is activated.

At block 430, the terminal device may provide a first start offset and a secondary start offset, wherein the first start offset shall be used when the discontinuous transmission is deactivated and the secondary start offset shall be used for the activated configuration for the discontinuous transmission.

At block 440, the terminal device may select the first start offset or the secondary start offset for connected discontinuous reception of the terminal device during the activated discontinuous transmission of the cell.

In some example embodiments, the example method 400 may include an operation of receiving, from the network device, a first configuration message comprising a distribution factor, corresponding to the configuration for the discontinuous transmission, for determining the secondary start offset, to make an on-duration period of the connected discontinuous reception at least partly overlap with the active period of the activated configuration for the discontinuous transmission.

In some example embodiments, the first indication comprises a second indication indicating the terminal device to compute the secondary start offset, and the apparatus may be configured to compute the secondary start offset based on at least one of a start offset of the activated configuration for the discontinuous transmission, the first start offset, the active period of the activated configuration for the discontinuous transmission or the distribution factor corresponding to the activated configuration for the discontinuous transmission.

In some example embodiments, the apparatus may be configured to compute the secondary start offset based on at least one of the a start offset of the activated configuration for the discontinuous transmission, the first start offset, the active period of the activated configuration for the discontinuous transmission, or the distribution factor corresponding to the activated configuration for the discontinuous transmission when receiving the first indication.

In some example embodiments, the first start offset is selected if an on-duration period of the connected discontinuous reception according to the first start offset at least partly overlaps with the active period of the activated configuration for the discontinuous transmission.

In some example embodiments, the example method 400 may include an operation of receiving, from the network device, a second configuration message comprising at least one secondary start offset; and determining the secondary start offset based on the at least one secondary start offset.

In some example embodiments, the apparatus is configured to: in a case where the at least one secondary start offset corresponds to the configuration for the discontinuous transmission, determine the secondary start offset corresponding to the activated configuration for the discontinuous transmission when receiving the first indication.

In some example embodiments, the apparatus is configured to: in a case where the first indication indicates one of the at least one secondary start offset, determine the secondary start offset based on the first indication.

In some example embodiments, the apparatus is configured to: compute the secondary start offset based on at least one of a start offset of the activated configuration for the discontinuous transmission, an identifier of the terminal device or the active period of the activated configuration for the discontinuous transmission.

In some example embodiments, the apparatus is configured to: receive the first indication via downlink control information.

In some example embodiments, the example method 400 may include an operation of monitoring a physical downlink control channel at a start of the active period of the activated configuration for the discontinuous transmission in a case where an on-duration period of the connected discontinuous reception according to the secondary start offset falls outside the active period of the activated configuration for the discontinuous transmission.

Figure 5:
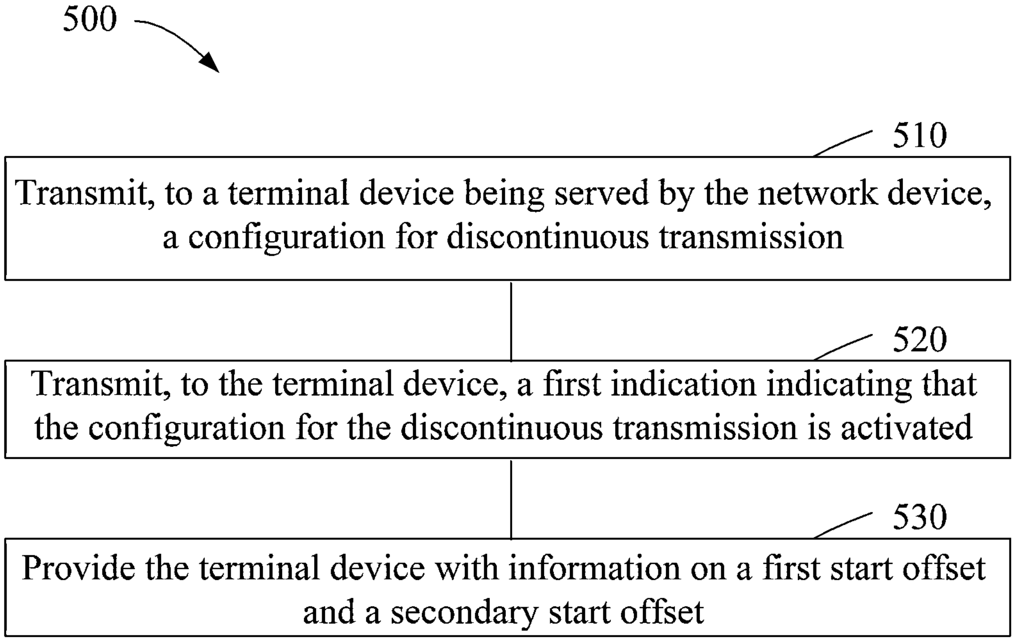
FIG. 5 shows a flow chart illustrating an example method implemented at a network device according to example embodiments of the present disclosure.

FIG. 5 shows a flowchart of an example method 500 for performing alignment of the cell DTX and UE C-DRX according to an example embodiment of the present disclosure. The method 500 can be implemented at a network device e.g. the network device 220 discussed above. In some example embodiments, the method 500 may further include one or more steps that are performed at the network device 220 as described above with respect to FIGS. 2-3. It would also be understood that details of some steps in the procedure 500 have been discussed above with respect to FIGS. 2-3 and the procedure 500 will be described here in a simple manner.

At block 510, the network device may transmit, to a terminal device being served by the network device, a configuration for discontinuous transmission defining an active period and a non-active period of a cell associated with the network device.

At block 520, the network device may transmit, to the terminal device, a first indication indicating that the configuration for the discontinuous transmission is activated.

At block 530, the network device may provide the terminal device with information on a first start offset and a secondary start offset. he first start offset may be used by the terminal device when the discontinuous transmission is deactivated and the secondary start offset may be used by the terminal device for the activated configuration for the discontinuous transmission.

In some example embodiments, the example method 500 may include an operation of transmitting, to the terminal device, a first configuration message comprising a distribution factor, corresponding to the configuration for the discontinuous transmission, for the terminal device to compute the secondary start offset to make an on-duration period of a connected discontinuous reception of the terminal device at least partly overlaps with the active period of the activated configuration for the discontinuous transmission.

In some example embodiments, the first indication comprises a second indication indicating the terminal device whether to compute the secondary start offset.

In some example embodiments, the example method 500 may include an operation of transmitting, to the terminal device, a second configuration message comprising at least one secondary start offset for the terminal device to determine the secondary start offset.

In some example embodiments, the at least one secondary start offset corresponds to the configuration for the discontinuous transmission.

In some example embodiments, the first indication indicates one of the at least one secondary start offset.

In some example embodiments, the apparatus is configured to: transmit the first indication via downlink control information.

Figure 6:
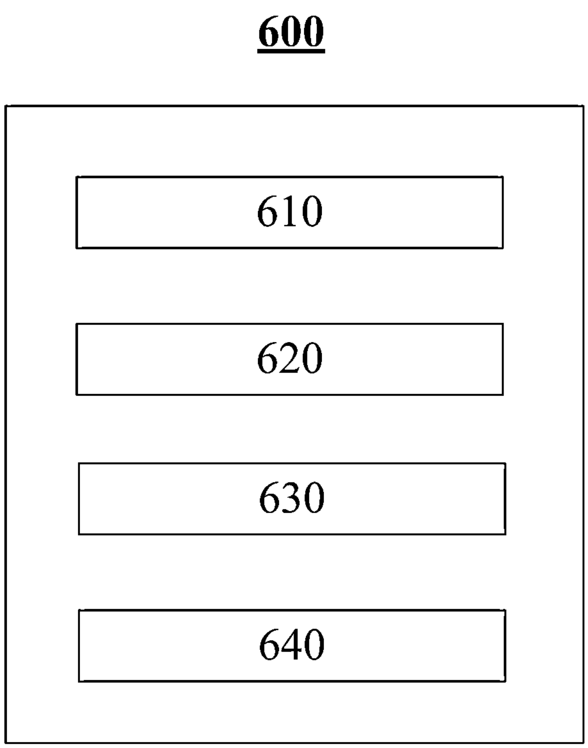
FIG. 6 shows a block diagram illustrating an example device for performing alignment of the cell DTX and UE c-DRX according to example embodiments of the present disclosure.

FIG. 6 is a block diagram illustrating an apparatus 600 according to an example embodiment of the present disclosure. The apparatus 600 may be implemented at a terminal device like the terminal device 210 to perform operations relating to the terminal device 210 as discussed above. Since the operations relating to the terminal device 210 have been discussed in detail with reference to FIGS. 2-3, the blocks of the apparatus 600 will be described briefly here and details thereof may refer to the above description.

Referring to FIG. 6, the apparatus 600 may include a first means 610 for receiving, from a network device serving the terminal device, a configuration for discontinuous transmission defining an active period and a non-active period of a cell associated with the network device; a second means 620 for receiving, from the network device, a first indication indicating that the configuration for the discontinuous transmission is activated; a third means 630 for providing a first start offset and a secondary start offset, wherein the first start offset shall be used when the discontinuous transmission is deactivated and the secondary start offset shall be used for the activated configuration for the discontinuous transmission; and a fourth means 640 for selecting the first start offset or the secondary start offset for connected discontinuous reception of the terminal device during the activated discontinuous transmission of the cell.

In some example embodiments, the apparatus 600 may further include a means for receiving, from the network device, a first configuration message comprising a distribution factor, corresponding to the configuration for the discontinuous transmission, for determining the secondary start offset, to make an on-duration period of the connected discontinuous reception at least partly overlap with the active period of the activated configuration for the discontinuous transmission.

In some example embodiments, the apparatus 600 may further include a means for receiving, from the network device, a second configuration message comprising at least one secondary start offset.

In some example embodiments, the apparatus 600 may further include a means for monitoring a physical downlink control channel at a start of the active period of the activated configuration for the discontinuous transmission in a case where an on-duration period of the connected discontinuous reception according to the secondary start offset falls outside the active period of the activated configuration for the discontinuous transmission.

Figure 7:
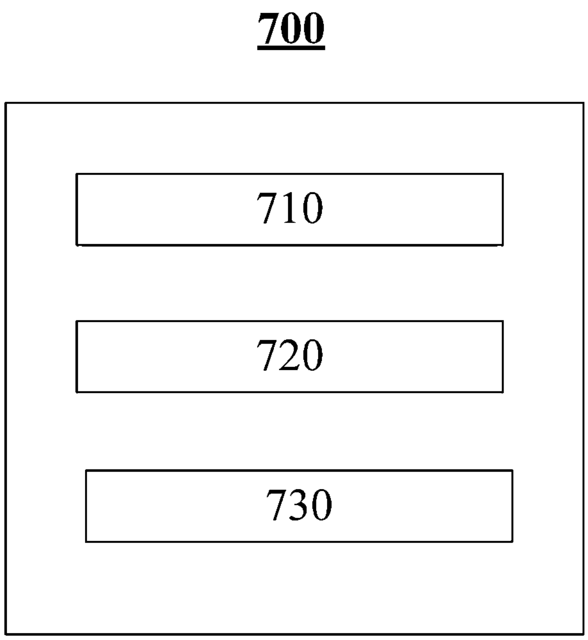
FIG. 7 shows a block diagram illustrating an example device for performing alignment of the cell DTX and UE c-DRX according to example embodiments of the present disclosure.

FIG. 7 is a block diagram illustrating an apparatus 700 according to an example embodiment of the present disclosure. The apparatus 700 may be implemented at a network device like the network device 220 to perform operations relating to the network device 220 as discussed above. Since the operations relating to the network device 220 have been discussed in detail with reference to FIGS. 2-3, the blocks of the apparatus 700 will be described briefly here and details thereof may refer to the above description.

Referring to FIG. 7, the apparatus 700 may include a first means 710 for transmitting, to a terminal device being served by the network device, a configuration for discontinuous transmission defining an active period and a non-active period of a cell associated with the network device; a second means 720 for transmitting, to the network device, a first indication indicating that the configuration for the discontinuous transmission is activated; and a third means 730 for providing the terminal device with information on a first start offset and a secondary start offset, wherein the first start offset shall be used by the terminal device when the discontinuous transmission is deactivated and the secondary start offset shall be used by the terminal device for the activated configuration for the discontinuous transmission.

In some example embodiments, the apparatus 700 may further include a means for transmitting, to the terminal device, a first configuration message comprising a distribution factor, corresponding to the configuration for the discontinuous transmission, for the terminal device to compute the secondary start offset to make an on-duration period of a connected discontinuous reception of the terminal device at least partly overlaps with the active period of the activated configuration for the discontinuous transmission.

In some example embodiments, the apparatus 700 may further include a means for transmitting, to the terminal device, a second configuration message comprising at least one secondary start offset for the terminal device to determine the secondary start offset.

Figure 8:
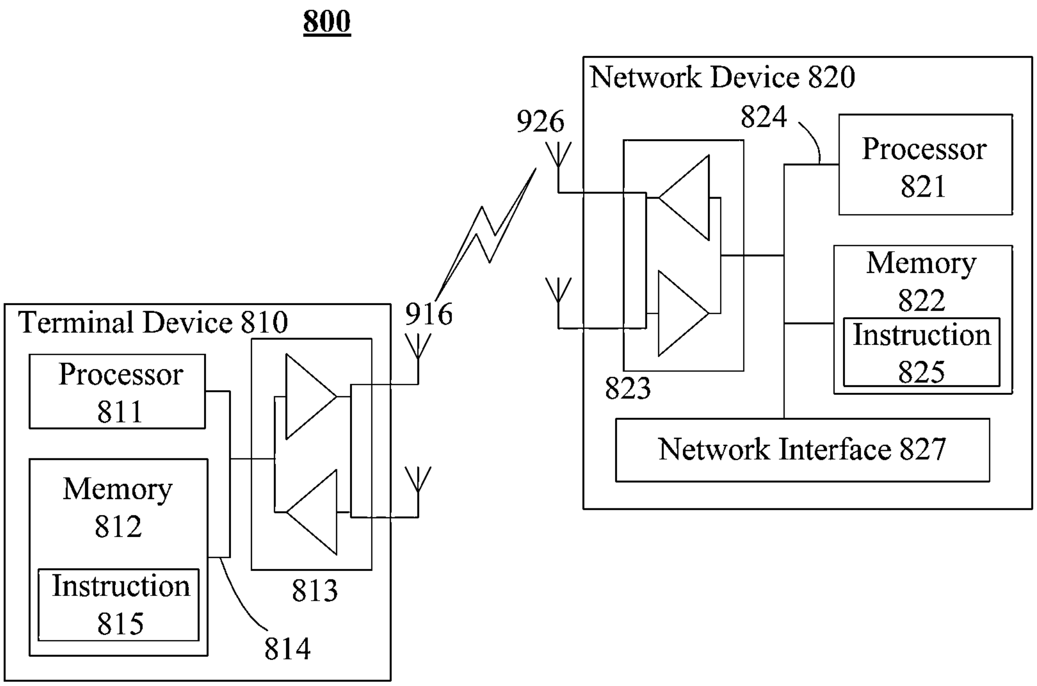
FIG. 8 is a block diagram illustrating devices in a communication system in accordance with an example embodiment of the present disclosure.

FIG. 8 is a block diagram illustrating devices in a communication system 800 in accordance with an example embodiment of the present disclosure. As shown in FIG. 8, the communication system 800 may comprise a terminal device 810 which may be implemented as the terminal device 210 discussed above and a network device 820 which may be implemented as the network device 220 discussed above.

Referring to FIG. 8, the terminal device 810 may comprise one or more processors 811, one or more memories 812 and one or more transceivers 813 interconnected through one or more buses 814. The one or more buses 814 may be address, data, or control buses, and may include any interconnection mechanism such as series of lines on a motherboard or integrated circuit, fiber, optics or other optical communication equipment, and the like. Each of the one or more transceivers 813 may comprise a receiver and a transmitter, which are connected to one or more antennas 816. The terminal device 810 may wirelessly communicate with the radio access network device 820 through the one or more antennas 816. The one or more memories 812 may include instructions 815 which, when executed by the one or more processors 811, may cause the terminal device 810 to perform operations and procedures relating to the terminal device 210 as described above.

The network device 820 may comprise one or more processors 821, one or more memories 822, one or more transceivers 823 and one or more network interfaces 827 interconnected through one or more buses 824. The one or more buses 824 may be address, data, or control buses, and may include any interconnection mechanism such as a series of lines on a motherboard or integrated circuit, fiber, optics or other optical communication equipment, and the like. Each of the one or more transceivers 823 may comprise a receiver and a transmitter, which are connected to one or more antennas 826. The network device 820 may operate as a base station for the terminal device 810 and wirelessly communicate with terminal device 810 through the one or more antennas 826. The one or more network interfaces 827 may provide wired or wireless communication links through which the network device 820 may communicate with other network devices, entities, elements or functions. For example, the network device 820 may communicate with a core network device (not shown) via backhaul connections. The one or more memories 822 may include instructions 825 which, when executed by the one or more processors 821, may cause the network device 820 to perform operations and procedures relating to the network device 220.

The one or more processors 811, 821 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 811, 821 may be configured to control other elements of the UE/radio access network device/core network device and operate in cooperation with them to implement the procedures discussed above.

The one or more memories 812, 822 may include at least one storage medium in various forms, such as a transitory memory and/or a non-transitory memory. The transitory memory may include, but not limited to, for example, a random access memory (RAM) or a cache. The non-transitory memory may include, but not limited to, for example, a read only memory (ROM), a hard disk, a flash memory, and the like. The term "non-transitory," as used herein, is a limitation of the medium itself (i.e., tangible, not a signal) as opposed to a limitation on data storage persistency (e.g., RAM vs. ROM). Further, the one or more memories 812, 822 may include but not limited to an electric, a magnetic, an optical, an electromagnetic, an infrared, or a semiconductor system, apparatus, or device or any combination of the above.

Some exemplary embodiments further provide computer program instruction or instructions which, when executed by one or more processors, may cause a device or apparatus to perform the procedures described above. The program instruction for carrying out procedures of the exemplary embodiments may be written in any combination of one or more programming languages. The program instruction may be provided to one or more processors or controllers of a general purpose computer, special purpose computer, or other programmable data processing apparatus, such that the program instruction, when executed by the processor or controller, cause the functions/operations specified in the flowcharts and/or block diagrams to be implemented. The program instruction may execute entirely on a machine, partly on the machine, as a stand-alone software package, partly on the machine and partly on a remote machine or entirely on the remote machine or server.

Some exemplary embodiments further provide a computer program product or a computer readable medium having the program instruction or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

Certain abbreviations that may be found in the description and/or in the figures are herewith defined as follows:

C-DRX connected mode discontinuous reception

DCI downlink control information

DTX discontinuous transmissions

NES network energy saving

PDCCH physical downlink control channel

RRC radio resource control

SFN system frame number

UE user equipment

The invention claimed is:

1. A terminal device, comprising:

at least one processor; and at least one memory storing instructions that, when executed by the at least one processor, cause the terminal device at least to:

receive, from a network device serving the terminal device, a configuration for discontinuous transmission defining an active period and a non-active period of a cell associated with the network device, the configuration comprising a on-duration period, a periodicity, and a first start offset, the first start offset defining a start of the on-duration period of a connected discontinuous reception (c-DRX) of the terminal device that is used at least when the cell discontinuous transmission is deactivated;

receive, from the network device, a first indication indicating that the configuration for the discontinuous transmission is activated, wherein the first indication comprises a second indication indicating the terminal device to compute a secondary start offset;

receive, from the network device, a first configuration message comprising a distribution factor, corresponding to the configuration for the discontinuous transmission, for determining the secondary start offset, to make the on-duration period of a connected discontinuous reception at least partly overlap with the active period of an activated configuration for the discontinuous transmission when the first start offset results in the on-duration period not overlapping with the active period;

based on the first start offset resulting in the on-duration period not overlapping with the active period, compute the secondary start offset based on a start offset of the activated configuration for the discontinuous transmission, the first start offset, the active period of the activated configuration for the discontinuous transmission, and the distribution factor corresponding to the activated configuration for the discontinuous transmission;

select the secondary start offset for connected discontinuous reception of the terminal device during the activated discontinuous transmission of the cell; and upon determining that the configuration is deactivated based on a network load being too high, resume application of the first start offset.

2. The terminal device of claim 1, wherein the instructions, when executed by the at least one processor, further cause the terminal device at least to:

in a case where the at least one secondary start offset corresponds to the configuration for the discontinuous transmission, determine the secondary start offset corresponding to the activated configuration for the discontinuous transmission when receiving the first indication.

3. The terminal device of claim 2, wherein the first start offset is selected when the on-duration period of the connected discontinuous reception according to the first start offset at least partly overlaps with the active period of the activated configuration for the discontinuous transmission.

4. The terminal device of claim 3, wherein the instructions, when executed by the at least one processor, further cause the terminal device at least to:

receive, from the network device, a second configuration message comprising at least one secondary start offset; and determine the secondary start offset based further on the at least one secondary start offset.

5. The terminal device of claim 4, wherein the instructions, when executed by the at least one processor, further cause the terminal device at least to:

in a case where the at least one secondary start offset corresponds to the configuration for the discontinuous transmission, determine the secondary start offset corresponding to the activated configuration for the discontinuous transmission when receiving the first indication.

6. The terminal device of claim 5, wherein the first indication is received via downlink control information.

7. The terminal device of claim 6, wherein the instructions, when executed by the at least one processor, further cause the terminal device at least to:

monitor a physical downlink control channel at a start of the active period of the activated configuration for the discontinuous transmission in a case where an on-duration period of the connected discontinuous reception according to the secondary start offset falls outside the active period of the activated configuration for the discontinuous transmission.

8. A system comprising:

a terminal device, comprising:

at least one processor; and at least one memory storing instructions that, when executed by the at least one processor, cause the terminal device at least to:

receive, from a network device serving the terminal device, a configuration for discontinuous transmission defining an active period and a non-active period of a cell associated with the network device, the configuration comprising a on-duration period, a periodicity, and a first start offset, the first start offset defining a start of the on-duration period of a connected discontinuous reception (c-DRX) of the terminal device that is used at least when the cell discontinuous transmission is deactivated;

receive, from the network device, a first indication indicating that the configuration for the discontinuous transmission is activated, wherein the first indication comprises a second indication indicating the terminal device to compute a secondary start offset;

receive, from the network device, a first configuration message comprising a distribution factor, corresponding to the configuration for the discontinuous transmission, for determining the secondary start offset, to make the on-duration period of a connected discontinuous reception at least partly overlap with the active period of an activated configuration for the discontinuous transmission when the first start offset results in the on-duration period not overlapping with the active period;

based on the first start offset resulting in the on-duration period not overlapping with the active period, compute the secondary start offset based on a start offset of the activated configuration for the discontinuous transmission, the first start offset, the active period of the activated configuration for the discontinuous transmission, and the distribution factor corresponding to the activated configuration for the discontinuous transmission;

select the secondary start offset for connected discontinuous reception of the terminal device during the activated discontinuous transmission of the cell; and upon determining that the configuration is deactivated based on a network load being too high, resume application of the first start offset.

9. The system of claim 8, wherein the instructions, when executed by the at least one processor, further cause the terminal device at least to:

in a case where the at least one secondary start offset corresponds to the configuration for the discontinuous transmission, determine the secondary start offset corresponding to the activated configuration for the discontinuous transmission when receiving the first indication.

10. The system of claim 9, wherein the first start offset is selected when the on-duration period of the connected discontinuous reception according to the first start offset at least partly overlaps with the active period of the activated configuration for the discontinuous transmission.

11. The system of claim 10, wherein the instructions, when executed by the at least one processor, further cause the terminal device at least to:

receive, from the network device, a second configuration message comprising at least one secondary start offset; and determine the secondary start offset based further on the at least one secondary start offset.

12. The system of claim 11, wherein the instructions, when executed by the at least one processor, further cause the terminal device at least to:

in a case where the at least one secondary start offset corresponds to the configuration for the discontinuous transmission, determine the secondary start offset corresponding to the activated configuration for the discontinuous transmission when receiving the first indication.

13. The system of claim 12, wherein the first indication is received via downlink control information.

14. The system of claim 13, wherein the instructions, when executed by the at least one processor, further cause the terminal device at least to:

monitor a physical downlink control channel at a start of the active period of the activated configuration for the discontinuous transmission in a case where an on-duration period of the connected discontinuous reception according to the secondary start offset falls outside the active period of the activated configuration for the discontinuous transmission.

15. A method comprising:

receiving, from a network device serving the terminal device, a configuration for discontinuous transmission defining an active period and a non-active period of a cell associated with the network device, the configuration comprising a on-duration period, a periodicity, and a first start offset, the first start offset defining a start of the on-duration period of a connected discontinuous reception (c-DRX) of the terminal device that is used at least when the cell discontinuous transmission is deactivated;

receiving, from the network device, a first indication indicating that the configuration for the discontinuous transmission is activated, wherein the first indication comprises a second indication indicating the terminal device to compute a secondary start offset;

receiving, from the network device, a first configuration message comprising a distribution factor, corresponding to the configuration for the discontinuous transmission, for determining the secondary start offset, to make the on-duration period of a connected discontinuous reception at least partly overlap with the active period of an activated configuration for the discontinuous transmission when the first start offset results in the on-duration period not overlapping with the active period;

based on the first start offset resulting in the on-duration period not overlapping with the active period, computing the secondary start offset based on a start offset of the activated configuration for the discontinuous transmission, the first start offset, the active period of the activated configuration for the discontinuous transmission, and the distribution factor corresponding to the activated configuration for the discontinuous transmission;

selecting the secondary start offset for connected discontinuous reception of the terminal device during the activated discontinuous transmission of the cell; and upon determining that the configuration is deactivated based on a network load being too high, resuming application of the first start offset.

16. The method of claim 15, wherein the first start offset is selected when the on-duration period of the connected discontinuous reception according to the first start offset at least partly overlaps with the active period of the activated configuration for the discontinuous transmission.

17. The method of claim 16, further comprising:

receiving, from the network device, a second configuration message comprising at least one secondary start offset; and determining the secondary start offset based further on the at least one secondary start offset.

18. The method of claim 17, further comprising: in a case where the at least one secondary start offset corresponds to the configuration for the discontinuous transmission, determine the secondary start offset corresponding to the activated configuration for the discontinuous transmission when receiving the first indication.

19. The method of claim 18, wherein the first indication is received via downlink control information.

20. The method of claim 19, further comprising: monitoring a physical downlink control channel at a start of the active period of the activated configuration for the discontinuous transmission when the on-duration period of the connected discontinuous reception according to the secondary start offset falls outside the active period of the activated configuration for the discontinuous transmission.

* * * * *